(12) United States Patent
Sainath et al.

(10) Patent No.: US 9,418,334 B2
(45) Date of Patent: Aug. 16, 2016

(54) HYBRID PRE-TRAINING OF DEEP BELIEF NETWORKS

(71) Applicant: Nuance Communications, Inc., Burlington, MA (US)

(72) Inventors: Tara N. Sainath, Burlington, MA (US); Brian Kingsbury, Burlington, MA (US); Bhuvana Ramabhadran, Burlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 411 days.

(21) Appl. No.: 13/707,088

(22) Filed: Dec. 6, 2012

(65) Prior Publication Data

US 2014/0164299 A1 Jun. 12, 2014

(51) Int. Cl.
*G06N 3/08* (2006.01)

(52) U.S. Cl.
CPC .......... *G06N 3/08* (2013.01)

(58) Field of Classification Search
None
See application file for complete search history.

(56) References Cited

U.S. PATENT DOCUMENTS

| | | | | |
|---|---|---|---|---|
| 2012/0065976 | A1* | 3/2012 | Deng et al. | 704/256.1 |
| 2012/0072215 | A1* | 3/2012 | Yu et al. | 704/240 |
| 2012/0254086 | A1* | 10/2012 | Deng et al. | 706/25 |
| 2013/0138436 | A1* | 5/2013 | Yu et al. | 704/232 |

OTHER PUBLICATIONS

Dahl, George E., et al. "Context-dependent pre-trained deep neural networks for large-vocabulary speech recognition." Audio, Speech, and Language Processing, IEEE Transactions on 20.1 (2012): 30-42.*

Lasserre, Julia A., Christopher M. Bishop, and Thomas P. Minka. "Principled hybrids of generative and discriminative models." Computer Vision and Pattern Recognition, 2006 IEEE Computer Society Conference on. vol. 1. IEEE, 2006.*

Veselý, Karel, Lukáš Burget, and František Grézl. "Parallel training of neural networks for speech recognition." Text, Speech and Dialogue. Springer Berlin Heidelberg, 2010.*

Hinton, Geoffrey, Simon Osindero, and Yee-Whye Teh. "A fast learning algorithm for deep belief nets." Neural computation 18.7 (2006): 1527-1554.*

Hinton, Geoffrey. "A practical guide to training restricted Boltzmann machines."Momentum 9.1 (2010): 926.*

Bourlard, Herve A., and Nelson Morgan. Connectionist speech recognition: a hybrid approach. vol. 247. Springer, 1994.*

Seide, Frank, Gang Li, and Dong Yu. "Conversational Speech Transcription Using Context-Dependent Deep Neural Networks." Interspeech. 2011.*

Sainath, Tara N., et al. "Making deep belief networks effective for large vocabulary continuous speech recognition." Automatic Speech Recognition and Understanding (ASRU), 2011 IEEE Workshop on. IEEE, 2011.*

(Continued)

*Primary Examiner* — Kakali Chaki
*Assistant Examiner* — Daniel Pellett
(74) *Attorney, Agent, or Firm* — Wolf, Greenfield & Sacks, P.C.

(57) ABSTRACT

Pretraining for a DBN initializes weights of the DBN (Deep Belief Network) using a hybrid pre-training methodology. Hybrid pre-training employs generative component that allows the hybrid PT method to have better performance in WER (Word Error Rate) compared to the discriminative PT method. Hybrid pre-training learns weights which are more closely linked to the final objective function, allowing for a much larger batch size compared to generative PT, which allows for improvements in speed; and a larger batch size allows for parallelization of the gradient computation, speeding up training further.

20 Claims, 6 Drawing Sheets

(56) References Cited

OTHER PUBLICATIONS

Erhan, Dumitru, et al. "Why does unsupervised pre-training help deep learning?." The Journal of Machine Learning Research 11 (2010): 625-660.*

Bengio, Yoshua, et al. "Greedy layer-wise training of deep networks." Advances in neural information processing systems 19 (2007): 153.*

Hinton, Geoffrey E., and Ruslan R. Salakhutdinov. "Reducing the dimensionality of data with neural networks." Science 313.5786 (2006): 504-507.*

Larochelle, Hugo, et al. "Exploring strategies for training deep neural networks."The Journal of Machine Learning Research 10 (2009): 1-40.*

Seide, Frank, et al. "Feature engineering in context-dependent deep neural networks for conversational speech transcription." Automatic Speech Recognition and Understanding (ASRU), 2011 IEEE Workshop on. IEEE, 2011.*

Swersky, Kevin, et al. "A tutorial on stochastic approximation algorithms for training restricted Boltzmann machines and deep belief nets." Information Theory and Applications Workshop (ITA), 2010. IEEE, 2010.*

\* cited by examiner

HYBRID PRE-TRAINING OF DEEP BELIEF NETWORKS

BACKGROUND

Neural networks attempt to model or replicate human thought processes in programmed logic executable by a computer. Neural networks, are typically employed in pattern matching such as speech and facial recognition. Generally, results are obtained in terms of likely candidates or matches, rather than conventional programmed logic that responds rigidly to deterministic information. Stochastic values inject an element of probability or randomness for allowing neural networks to arrive at a "most likely" conclusion to complex analytical tasks.

Deep belief networks are probabilistic models that are composed of multiple layers of stochastic, latent variables. The latent variables typically have binary values and are often called hidden units or feature detectors. The top two layers have undirected, symmetric connections between them and form an associative memory. The lower layers receive top-down, directed connections from the layer above. The states of the units in the lowest layer represent a data vector.

Significant properties of deep belief networks include an efficient, layer-by-layer procedure for learning the top-down, pre-trained weights that determine how the variables in one layer depend on the variables in the layer above. After learning, the values of the latent variables in every layer can be inferred by a single, bottom-up pass that starts with an observed data vector in the bottom layer and uses the weights in the reverse direction.

Further, pre-training of deep belief networks occurs one layer at a time by treating the values of the latent variables in one layer, when they are being inferred from data, as the data for training the next layer. This efficient, so-called "greedy" learning can be followed by, or combined with, other learning procedures that fine-tune all of the weights to improve the generative or discriminative performance of the whole network.

Discriminative fine-tuning of deep belief networks can be performed by adding a final layer of variables that represent the desired outputs and backpropagating error derivatives. When networks with many hidden layers are applied to highly-structured input data, such as images, backpropagation works much better if the feature detectors in the hidden layers are initialized by learning a deep belief network that models the structure in the input data Conventional language processing receives user speech and processes the received voice signals into text, typically represented as an alphanumeric string (text) of characters in a target language for which the language processing application is configured. Language processing may be employed in a variety of contexts by supplementing or replacing conventional keyboard input with a speech recognition component or module for converting speech into text. Speech recognition capabilities therefore accompany other production applications for providing an alternate input path to allow spoken commands and data as an alternative to manual keyboard entry. The speech recognition component executes as a language processing application in communication with the production application for which they perform the speech recognition.

SUMMARY

Neural networks, and in particular deep belief networks (DBNs), are trained before being employed in production systems for decoding input. The training process is an iterative cycle of input samples illustrative of expected outputs. From the training, the network "learns" the inputs and corresponding likely outputs to enable decoding of actual data in the corresponding production system. Learning is an extended process, often taking several hours or more, and occurs in stages. Configurations herein are based, in part, on the observation that conventional approaches to training DBNs suffer from the shortcoming of extended duration and result in learned DBNs, or models, that exhibit high error rates, such as word error rates (WERs) in the case of a production application aimed at speech recognition.

Deep Belief Networks (DBNs) have gained increasing popularity in acoustic modeling over the past few years, showing improvements between 5-20% relative over state of the art Gaussian Mixture Model (GMM)/Hidden Markov Model (HMM) systems. However, DBNs are usually trained serially using stochastic gradient descent (SGD) and are computationally expensive to train, particularly on large vocabulary tasks.

Pre-training (PT) of deep belief networks (DBNs) is typically done unsupervised and generatively, and thus the learned weights are not linked to the final supervised objective function. Discriminative PT addresses this issue and therefore requires fewer iterations of fine-tuning compared to generative PT. However, in discriminative PT, weights in lower layers are not general enough compared to generative PT, and thus discriminative PT methods perform slightly worse compared to generative PT methods. Alternatively, disclosed further below is a hybrid PT methodology, combining the benefits of both generative and discriminative PT. Another benefit of hybrid PT is that it creates weights that are more closely linked to the fine-tuning objective function, thus allowing us to use a very large batch size during fine-tuning. This allows for methods like parallel stochastic gradient descent to be effective, resulting in a large speedup in fine-tuning training time. Experimental results indicate that combining hybrid PT with a larger batch size and parallel SGD allows for a fine-tuning speedup of 3 times compared to a generatively PT DBN.

DBN training typically consists of first generatively learning a set of unsupervised weights via Restricted Boltzmann Machines (RBMs), followed by a supervised discriminative fine-tuning back-propagation step. One reason DBN training is slow is that the generative pre-trained weights are not linked to the final cross-entropy objective function during fine-tuning. Recently, various studies performed pre-training in a discriminative fashion, where weights are pre-trained using the cross-entropy objective function. While some studies show that doing discriminative pre-training and then fine-tuning allows for slightly better results compared to doing generative RBM pre-training and then fine-tuning, others tend to suggest that discriminative pre-training degraded performance compared to generative pre-training.

One shortcoming with performing discriminative pre-training is that at every layer, weights are learned so as to minimize the cross-entropy of they system. This means that weights learned in lower layers are potentially not general enough, but rather too specific to the final DBN objective. Having generalized weights in lower layers has been shown to be helpful. Specifically, generalized concepts, such as edges, are typically captured in lower layers and more discriminative representations such as different faces, are captured in higher layers.

Disclosed herein is a method of pretraining for a DBN that encompasses initializing weights of the DBN using a hybrid pre-training methodology. The advantages of this pre-training is the following:

(1) Generative component of hybrid pre-training allows the hybrid PT method to have better performance in WER compared to the discriminative PT method. (2) Hybrid PT learns weights which are more closely linked to the final objective function, allowing for a much larger batch size compared to generative PT, which allows for improvements in speed; and (3) A larger batch size allows for parallelization of the gradient computation, speeding up training further.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
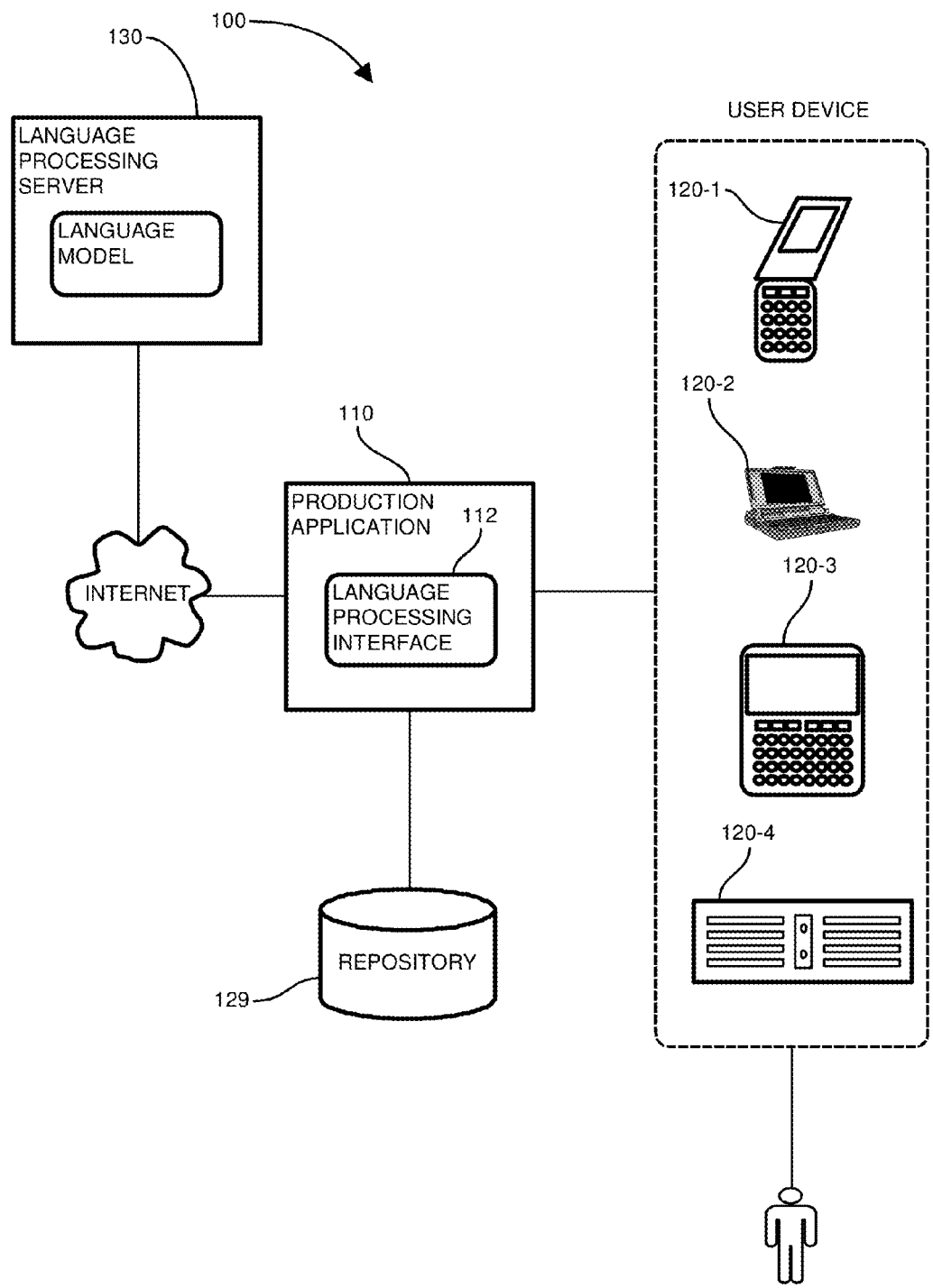
FIG. 1 is a context diagram of a language processing environment suitable for use with configurations disclosed herein

Deep belief networks are often employed in a production system that employs the trained network in conjunction with an application on a host device such as a user computing platform. The application employs the trained network for decoding input from the application and generating output indicative of the result based on the previously learned information. For example, FIG. 1 is a context diagram of an example language processing environment 100 suitable for use with configurations disclosed herein. Referring to FIG. 1, in the language processing environment 100, a production application 110 employs a language processing interface 112 for language processing capabilities to convert speech to text. The production application 110 typically executes on a user device 120 at the bequest of a user 122, and may be, for example, a cellphone 120-1, laptop or desktop computer 120-2, PDA 120-3, settop box 120-4 in conjunction with cable TV, or other suitable device. A language processing server 130 is accessible via the language processing interface 112, typically via an Internet 114 or other electronic connection 118, and invokes the DBN in the form of a language model 132. Alternatively, the language processing capability may be accessible directly to the production application 110 via a repository 129, if sufficient computing resources are available.

As indicated above, when performing generative pre-training, weights are learned in an unsupervised fashion and are not linked to the final objective of the DBN (i.e. to minimize cross-entropy during fine-tuning). Recently, certain approaches have performed pre-training using a layerwise backpropagation methodology, where pre-trained weights are better linked to the final DBN objective function. In this methodology, a 1-layer DBN was trained using backpropagation with discriminative labels. Then the softmax layer was thrown away and replaced by another randomly initialized hidden layer and softmax layer on top, and the new is discriminatively trained. This discriminative training is done greedy-wise similar to RBM pre-training. It has been found that by doing discriminative pre-training and then discriminative fine-tuning, it is possible to achieve slightly better results than doing generating RBM pre-training and discriminative fine-tuning.

A shortcoming with performing discriminative pre-training is that at every layer, weights are learned so as to minimize the cross-entropy of they system. This means that weights learned in lower layers are potentially not general enough, but rather too specific to the final DBN objective. Having generalized weights in lower layers has been shown to be helpful. Specifically, generalized concepts, such as edges, are typically captured in lower layers and more discriminative representations such as different faces, are captured in higher layers.

Disclosed further below are pre-training strategy that combines both the generative and discriminative benefits in a hybrid manner. In the disclosure below, notations include the following. Specifically, v will refer to visible unit, h to hidden unit, l to label, and W to the weight vector between v and h.

Conventional approaches have addressed performing a hybrid generative+discriminative fine-tuning. Configurations herein extend this concept to pre-training as well. Specifically weights are learned to maximize $F = \alpha \log P(l|v) + \log P(v,l)$. Here $P(l|v)$ is referred to as a discriminative component and is actually the same as the cross-entropy objective function typically used for DBN training. The term P(v,l) is the generative component and is learned via contrastive divergence. The conventional approaches explore this hybrid training approach for fine-tuning a one layer DBN; in contrast approaches below employ greedy-wise pre-training using this hybrid approach. Specifically, in greedy-wise pre-training, after two layers are trained, we throw out the softmax layer and replace it by another randomly initialized hidden layer and softmax layer on top. Greedywise hybrid training is performed now given the new layers.

Fine-tuning (also known as backpropagation) is most commonly performed using stochastic gradient descent (SGD). In this approach, a gradient is estimated using a subset of data points (referred to as a mini-batch) from the training set, and weights are subsequently updated. This is shown more clearly in Equation (1) where w is the weights, N refers to the mini-batch size, and Ji(w) is the gradient computed with respect to a single training example:

$$w := w - \alpha \sum_{i=1}^{N} \nabla J_i(w) \quad (1)$$

SGD algorithms sweep through the training set, updating weights after each mini-batch. Weights are most commonly initialized randomly or generatively, and therefore are in a poor space relative to the weight learned after fine-tuning has completed. This requires the batch size to be small in order to ensure a reliable estimate of the gradient is obtained.

However, when weights are pre-trained using a discriminative or hybrid PT method, the weights fall in a much better space compared to generatively PT weights. This allows for a larger batch size during fine-tuning, meaning that the gradient is computed over a larger number of training instances now.

In the above equation, the gradient is calculated as the sum of gradients from individual training examples. When the batch size is large (and thus number of training examples large), this allows the gradient computation to be parallelized across multiple worker computers. Specifically, on each worker a gradient is estimated using a subset of training examples, and then the gradients calculated on each computer are added together by a master computer to estimate the total gradient.

In operation, a comparison was performed between the performance involving generative, discriminative or hybrid pre-training, followed by standard fine-tuning backpropagation. Results in Table 1 indicate that discriminative PT performs slightly worse than generative PT, confirming the hypothesis that generalization of pre-trained weights is important. Notice that when including both generalization and discrimination benefits with hybrid PT, the WER improves over discriminative PT.

TABLE I

| METHOD | WER |
| --- | --- |
| Generative PT | 19.6 |
| Discriminative PT | 19.7 |
| Hybrid PT | 19.5 |

Table II shows a tradeoff between WER and batch size for generative and hybrid PT, since these two methods have the better WERs. Notice that after a batch size of 2,048 the WER of the generative PT method degrades whereas the hybrid PT method does not.

TABLE II

| Batch Size | Generative PT WER | Hybrid PT WER |
| --- | --- | --- |
| 512 | 19.6 | 19.5 |
| 2048 | 20.0 | 19.6 |

After identifying that the batch size could be made larger with hybrid PT compared to generative PT, the next question was how large can we make the batch size before a degradation in accuracy occurs. Accordingly, a fine-tuning was performed with a batch size of 1,024 for two epochs before increasing the batch size further. As shown in Table II, it was noted that even at a large batch size of 20K or 30K, the WER does not degrade substantially.

TABLE III

| Batch Size | Hybrid PT, WER |
| --- | --- |
| 10,240 | 19.6 |
| 15,360 | 19.7 |
| 20,480 | 19.8 |
| 30,720 | 19.9 |

Therefore, a large batch size implies that the gradient can be parallelized. Table IV below shows an improvement that with a large batch size, the fine-tuning training time can be improve by a factor of more than 1.5 using parallel SGD over serial SGD for the same batch size. In addition, hybrid PT+parallel SGD provides a large speedup over generative pre-training. The fine-tuning training time for generative PT with a batch size of 512, a commonly used size in the literature, is roughly 24.7 hours. With hybrid PT and a batch size of 30K, therefore, the training time is roughly 7.9 hours, a 3× speedup over generative PT with little loss in accuracy

TABLE IV

| Batch Size | Serial SGD Fine-Tuning Training Time (hrs) | Parallel SGD Fine-Tuning Training Time (hrs) | # Times Faster |
| --- | --- | --- | --- |
| 20,480 | 16.4 | 10.0 (4 workers) | 1.6× |
| 30,720 | 14.5 | 7.9 (5 workers) | 1.8× |

Figure 2:
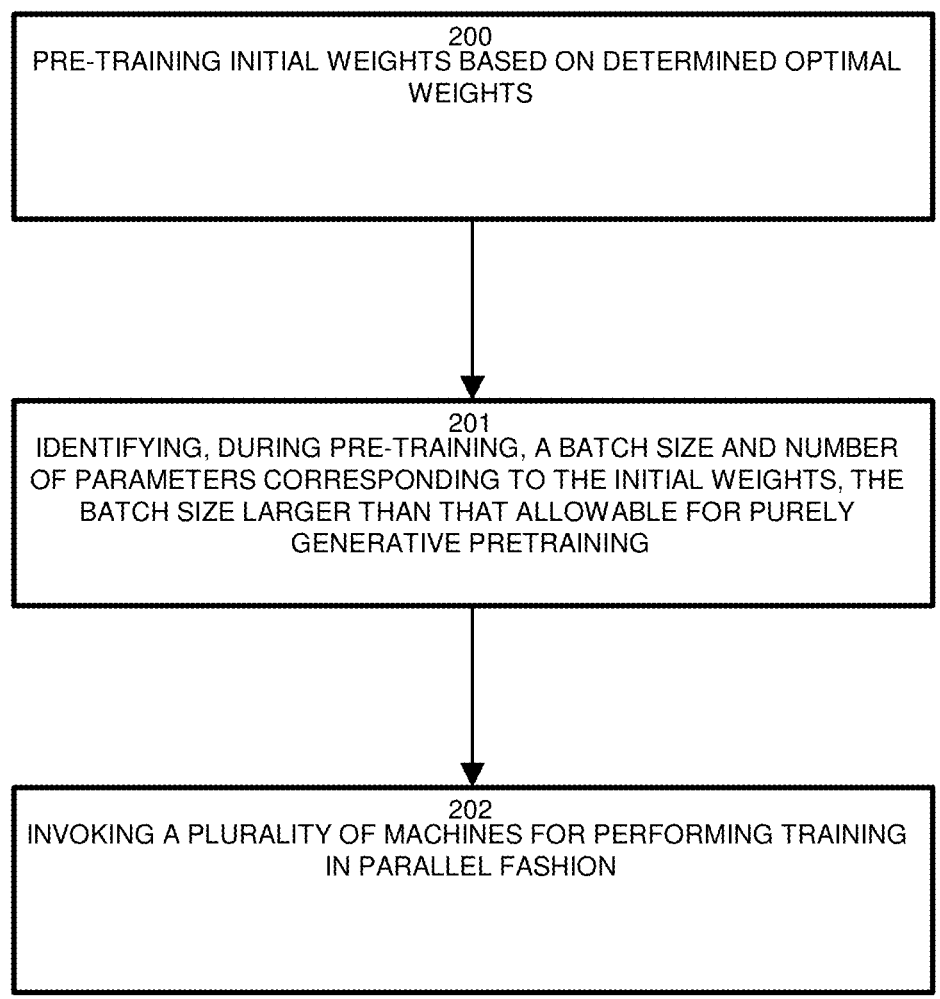
FIG. 2 is a flowchart of pre-training a DBN as disclosed herein.

FIG. 2 is a flowchart of pre-training a DBN as disclosed herein. Referring to FIGS. 1 and 2, In a deep belief network (DBN), the method for training the DBN for operational decoding as disclosed herein includes pre-training initial weights based on determined optimal weights, as depicted at step 200, and identifying, during pre-training, a batch size and number of parameters corresponding to the initial weights, such that the batch size is larger than that allowable for purely generative pre-training, as shown at step 201. The method then invokes a plurality of machines for performing training in parallel fashion, as disclosed at step 202, as the batch size is substantially large to allow for efficient parallelization. The hybrid pre-training employs both discriminative (supervised) and generative (unsupervised), which is beneficial because the weights are more closely linked than pre-training, but not too greedy.

In the example configuration, the pre-training may be performed on computer apparatus such as a the language processing server 130 for training a deep belief network (DBN) for operational decoding including a memory having an input layer for pre-training initial weights based on determined optimal weights. The language processing server 130 includes pre-training logic for identifying, during pre-training, a batch size and number of parameters corresponding to the initial weights, the batch size larger than that allowable for purely generative pre-training, and further comprises a plurality of machines, each having at least one processor, responsive to invocation for performing training in parallel fashion.

Figure 3:
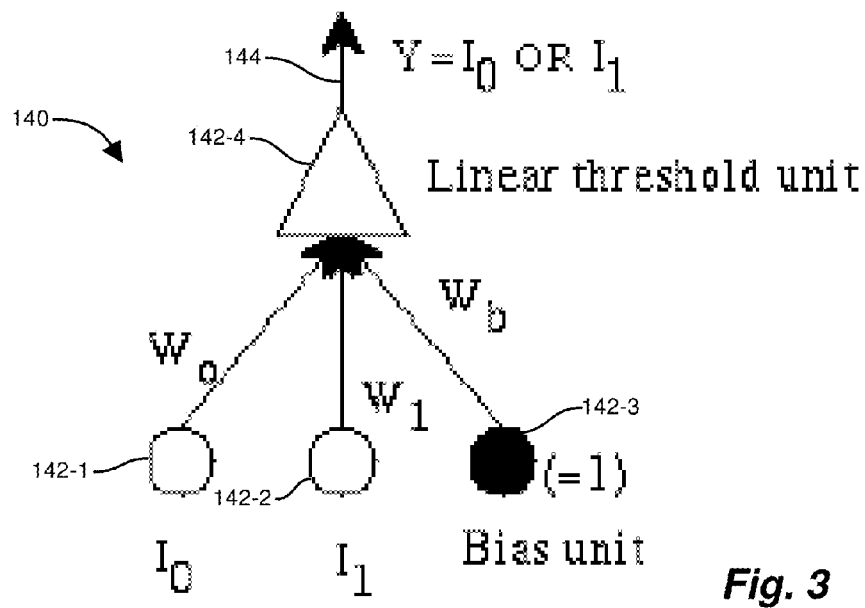
FIG. 3 is an example of a simple neural network.

FIG. 3 is an example of a simple neural network. Referring to FIG. 3, a DBN or other type of neural network is typically expressed as a directed graph 140 having nodes 142-1 . . . 142-4. Input nodes 142-1 and 142-2 represent parameters to node 142-4, which then fires if a threshold is met by the input nodes 142-1, 142-2 (142 generally). A bias unit 142-3 injects a stochastic element to node 142-4, and an output 144 is triggered if the threshold is met. Each output 144 may serve as an input to a successive node 142, as discussed further below.

In conventional approaches, so called mini-batch SGD remains the most popular approach for cross-entropy fine-tuning.

$$w := w - \gamma \sum_{i=1}^{B} grad_i(w, v_i)$$

Shortcomings of this approach are that the gradient cannot be parallelized because the batch size is small (100-1,000 frames), the number of parameters is large (10-50 M), and thus the cost to compute gradient and communicate parameters is high.

Figure 4:
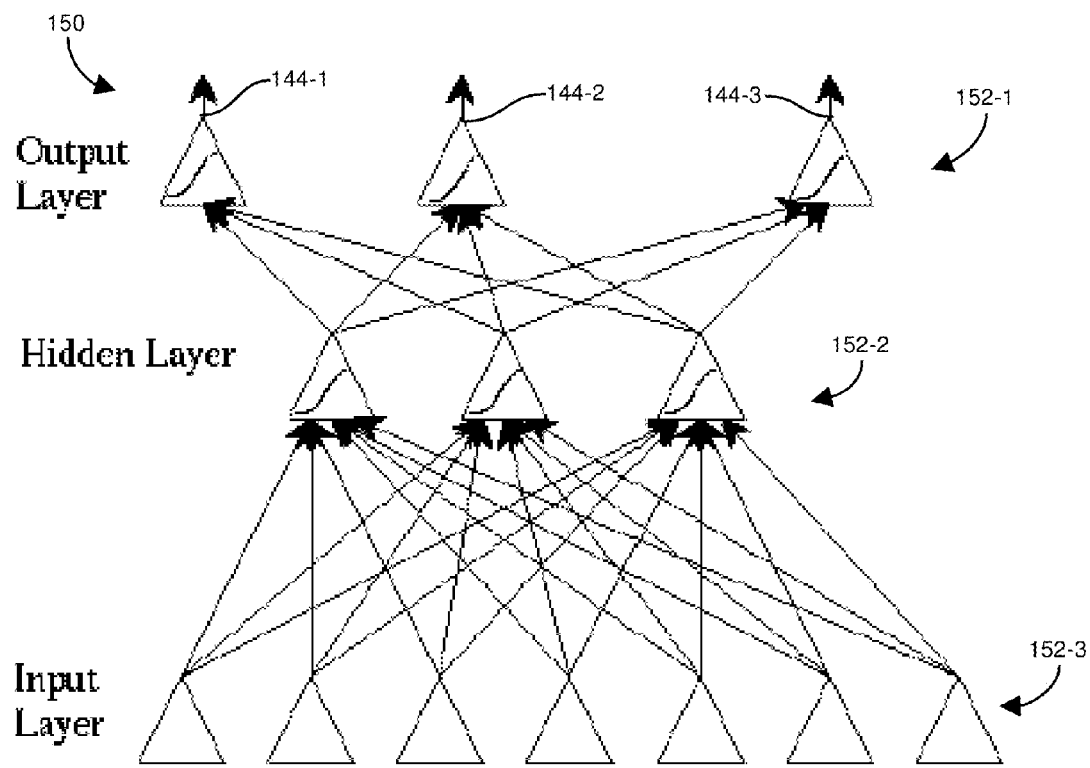
FIG. 4 is an example of a DBN as disclosed herein.

FIG. 4 is an example of a DBN as disclosed herein. Referring to FIGS. 3 and 4, the DBN 150 includes a plurality of layers 152-1 . . . 152-3 (152 generally). Each layer includes one or more nodes 142. The bottom, or first layer 152-1 represents input parameters, and the output 144-1 . . . 144-3 (144 generally) from the last, or top layer, represents the output from the DBN 150. One or more hidden layers 152-1 represent sets of nodes that receive input from the output of other nodes and provide input to successive nodes 142. As indicated above, the number of hidden layers may vary; typically a DBN includes at least two. The output 144 from the last, or top layer, represents the output from the DBN 150.

Figure 5:
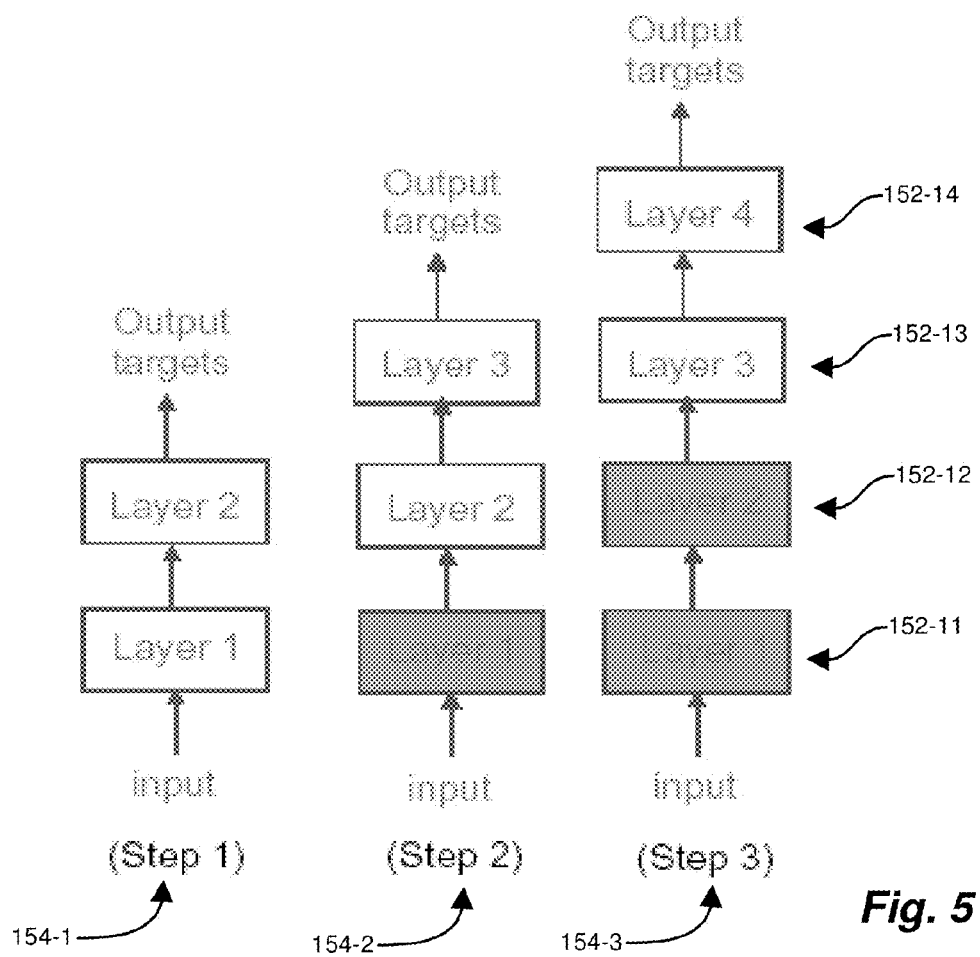
FIG. 5 shows hidden layers of hybrid pretraining as defined herein.

FIG. 5 shows hidden layers of hybrid pre-training as defined herein. Referring to FIG. 5, conventional pre-training is usually performed generatively and learned weights are not linked to final objective function (CE). One alternate approach considers doing greedy layer-wise discriminative pre-training, which provides the advantage that weights linked to final objective function, thus requiring fewer iterations of fine-tuning. However, the weights in the lower layers not sufficiently general and having generalized concepts in lower layers is helpful, thus resulting in possible degradation in WER In contrast, configurations herein disclose hybrid pre-training, which perform layer-wise training using the discriminative and generative objective function:

P(label|input)+αP(input,label)

Continuing to refer to FIG. 5, a plurality of steps 154-1 . . . 154-3 (154 generally) introduces hybrid pre-training at intermediate layers 152-11 . . . 152-14. As in FIG. 4, the intermediate layers 152-11 . . . 152-11 other than the input and output layers are hidden layers representing the benefits of the hybrid pre-training.

Figure 6:
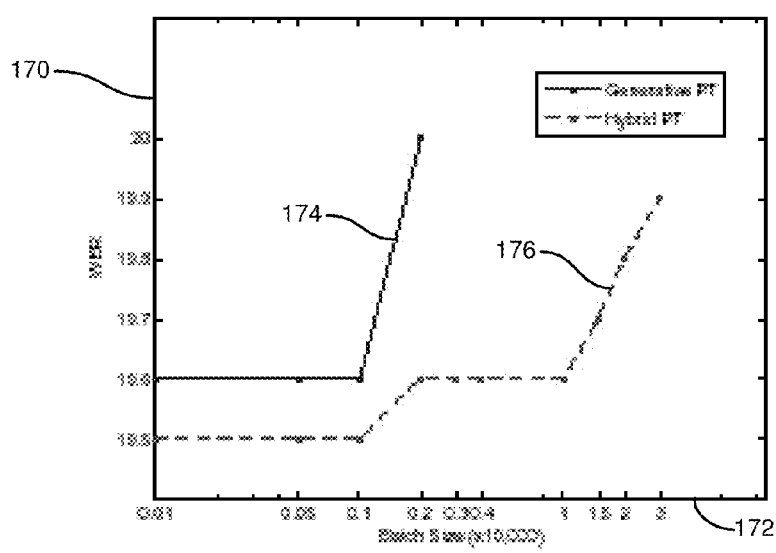
FIG. 6 shows performance improvements of hybrid pre-training.

FIG. 6 shows performance improvements of hybrid pre-training. Typically when generative pre-training is performed, a mini-batch size between 128-512 may be is used. The intuition, which we will show experimentally, is the following: If the batch size is too small, parallelization of matrix-matrix multiplies on CPUs is inefficient. A batch size which is too large often makes training unstable. However, when weights are in a much better initial space, a larger batch size can be used, speeding up training time further. FIG. 6 shows the WER 170 as a function of batch size 172 for both generative 174 and hybrid 176 pre-training methods. It should be noted that, after a batch size of 1,000, the WER of the generative pre-training method starts to rapidly increase, while with hybrid pre-training, we can have a batch size of 10,000 with no degradation in WER. Even at a batch size of 30,000 the WER degradation is minimal.

Having a large batch size implies that the gradient can efficiently be parallelized across worker machines. It has been shown that fine-tuning training time improvement by more than 1.5 results using parallel SGD over serial SGD for the same batch size of 30,000. In addition, hybrid PT+parallel SGD provides a large speedup over generative pre-training. The fine-tuning training time for generative PT with a batch size of 512, a commonly used size in the literature, is roughly 24.7 hours. With hybrid PT and a batch size of 30K, the training time is roughly 7.9 hours, a 3× speedup over generative PT with little loss in accuracy.

Approaches disclosed herein include a hybrid methodology to perform pre-training which combined both a generative and discriminative component. It has been demonstrated that hybrid pre-training initializes pre-trained weights in a much better space compared to generative pre-training, allowing or fewer iterations of fine-tuning. In addition, hybrid pre-training allows for more generalization compared to discriminative pre-training, resulting in an improvement in WER. Furthermore, we demonstrated that hybrid pre-training allows for a larger batch size during fine-tuning, allowing the gradient computation to be parallelized. Using hybrid PT+parallel SGD results in roughly a 3× speedup with little loss in accuracy compared to a generatively pre-trained DBN.

Figure 7:
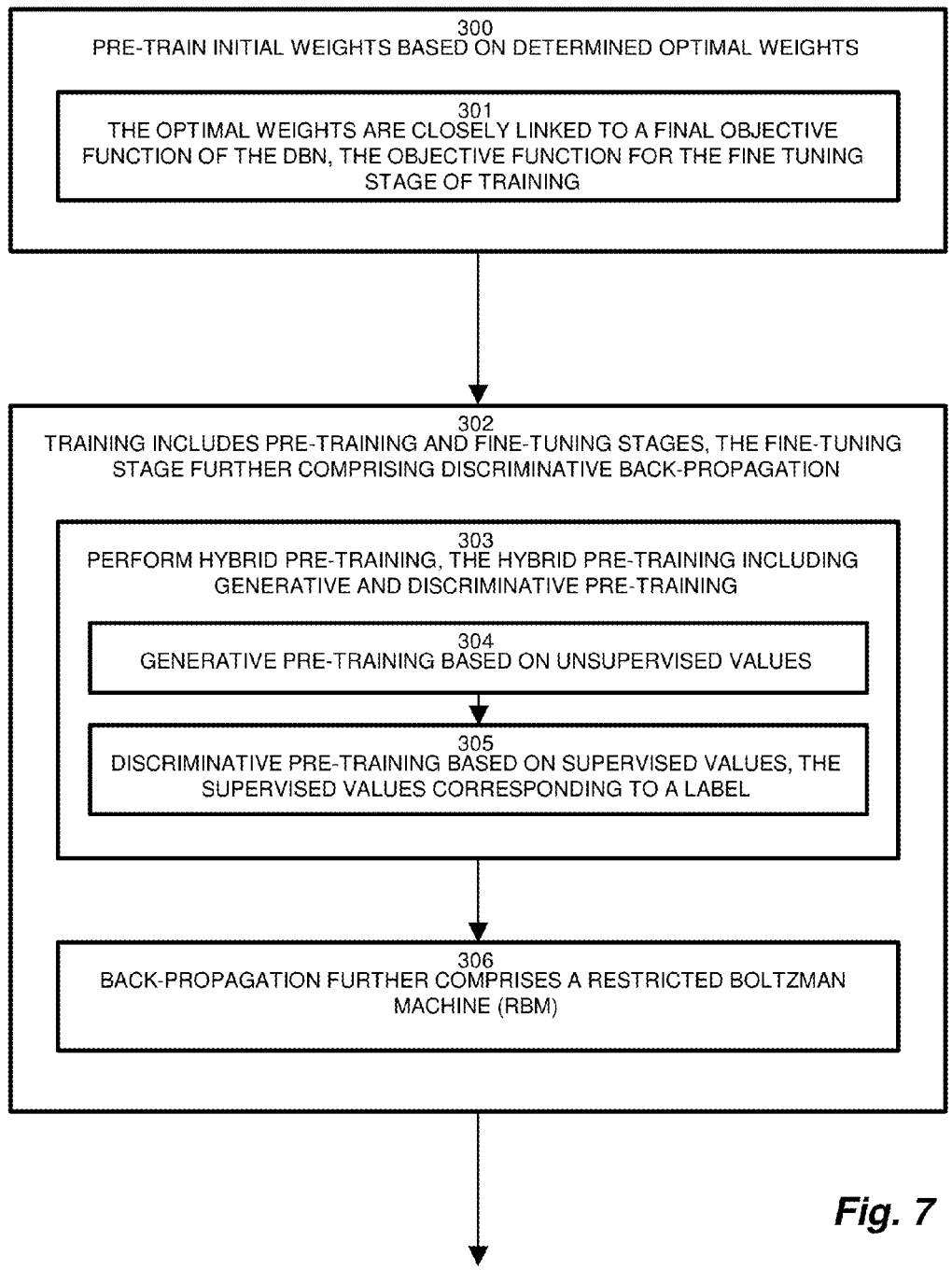
FIGS. 7 and 8 are a flowchart of hybrid pre-training as disclosed herein.
Figure 8:
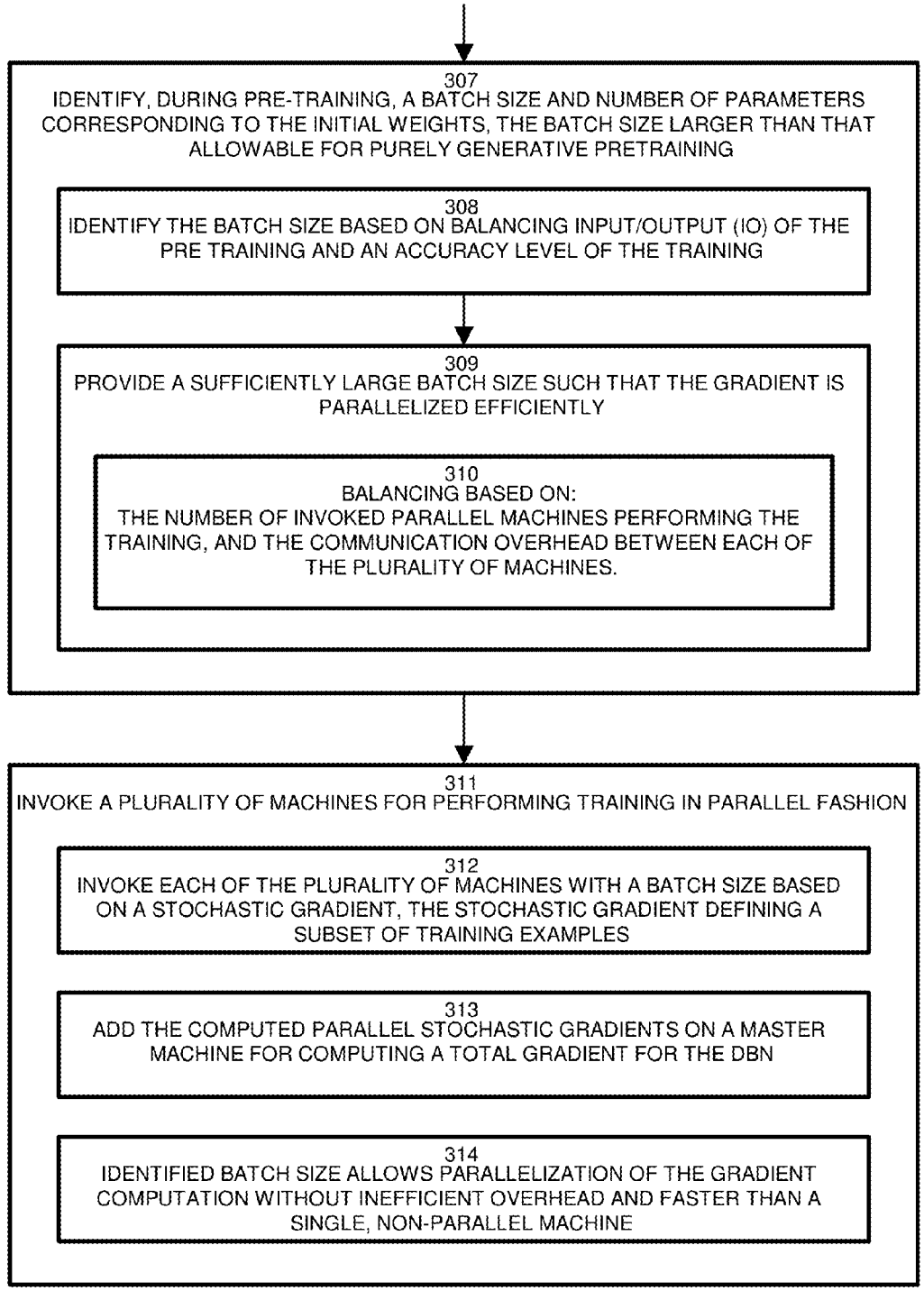

FIGS. 7 and 8 are a flowchart of hybrid pre-training as disclosed herein. In a deep belief network (DBN), a method for training the DBN for operational decoding includes pre-training initial weights based on determined optimal weights, as shown at step 300. Training is such that the optimal weights are closely linked to a final objective function of the DBN, the objective function for the fine tuning stage of training, as depicted at step 301. Training further comprises pre-training and fine-tuning stages, the fine-tuning stage further comprising discriminative back-propagation, as depicted at step 302. The example configuration shown performs hybrid pre-training, such that the hybrid pre training includes generative and discriminative pre-training, as shown at step 303. The generative pre-training is based on unsupervised values, as depicted at step 304, and the discriminative pre-training based on supervised values, such that the supervised values correspond to a label, as disclosed at step 305. Back-propagation further comprises a Restricted Boltzman Machine (RBM), as shown at step 306.

In the example arrangement, the DBN includes an input layer 152-11, an output layer 152-14, and a plurality of hidden layers 152-12, 13, such that the pre-training further includes pre-training at least two layers 152. The method replaces at least one of the layers 152 of the DBN 150 with a randomly initialized hidden layer. In a particular arrangement, the randomly initialized hidden layer is a softmax layer. The DBN identifies, during pre-training, a batch size and number of parameters corresponding to the initial weights, such that the batch size larger than that allowable for purely generative pre-training, as depicted at step 307. The larger batch size without increase in WER allows more efficient parallelization. This includes identifying the batch size based on balancing Input/Output (IO) of the pre training and an accuracy level of the training, as disclosed at step 308. In the example arrangement, it is desirable to provide a sufficiently large batch size such that the gradient is parallelized efficiently, as shown at step 309. Such balancing may be based on the number of invoked parallel machines performing the training, and the communication overhead between each of the plurality of machines, as depicted at step 310.

The method than invoking the invoked plurality of machines for performing training in parallel fashion, as disclosed at step 311. Parallelization in this manner includes invoking each of the plurality of machines with a batch size based on a stochastic gradient, such that the stochastic gradient defines a subset of training examples, as disclosed at step 312. From the results of each machine, the computed parallel stochastic gradients are added on a master machine for computing a total gradient for the DBN, as depicted at step 313. The identified batch size therefore allows parallelization of the gradient computation without inefficient overhead and faster than a single, non-parallel machine, as shown at step 314. This involves employing a batch size that is efficient for parallelization such that it may be performed faster with parallelization than without, and such that the batch size is not excessively large such that it is unstable Those skilled in the art should readily appreciate that the programs and methods for generating language processing classes as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of generating language processing classes has been particularly shown and described with references to embodiments thereof, it will be understood by those skilled in the art that various changes in form and details may be made therein without departing from the scope of the invention encompassed by the appended claims.

What is claimed is:

1. In a deep belief network (DBN), a method for training the DBN for operational decoding, the method comprising:
   pre-training initial weights based on determined optimal weights;
   identifying, during pre-training, a batch size for the DBN and a number of parameters corresponding to the initial weights,
   wherein:
      a first error rate increase corresponds to the batch size for the DBN and a second error rate increase corresponds to a generative, non-discriminative pre-training batch size,
      a first amount corresponds to the batch size for the DBN and to the generative, non-discriminative pre-training batch size,
      an increase by the first amount in the batch size corresponds to the first error rate increase for the DBN,
      an increase by the first amount in a generative, non-discriminative pre-training batch size corresponds to the second error rate increase, and
      the first error rate increase is less than the second error rate increase; and
   invoking a plurality of machines for performing training in parallel fashion.

2. The method of claim 1 further comprising performing hybrid pre-training,
   the hybrid pre-training including generative and discriminative pre-training;
   the generative pre-training being based on unsupervised values; and
   the discriminative pre-training being based on supervised values, the supervised values corresponding to a label.

3. The method of claim 1 wherein training further comprises a pre-training stage and a fine-tuning stage, the fine-tuning stage further comprising discriminative back-propagation.

4. The method of claim 3 wherein back-propagation further comprises using a Restricted Boltzmann Machine (RBM).

5. The method of claim 3 wherein the optimal weights are closely linked to a final objective function of the DBN, the objective function being for the fine-tuning stage of training.

6. The method of claim 2 wherein the DBN includes an input layer, an output layer, and a plurality of hidden layers, and wherein the pre-training further comprises:
   pre-training at least two layers; and
   replacing at least one layer of the DBN with a randomly initialized hidden layer.

7. The method of claim 6 wherein the randomly initialized hidden layer comprises a softmax layer.

8. The method of claim 1 further comprising identifying the batch size based on balancing Input/Output (TO) of the pre-training and an accuracy level of the training.

9. The method of claim 8 further comprising providing a sufficiently large batch size such that a computation of a gradient is parallelized efficiently.

10. The method of claim 8 wherein the balancing is based on:
    a number of invoked parallel machines performing the training; and
    a communication overhead between each of the plurality of machines.

11. The method of claim 10 further comprising:
    invoking each of the plurality of machines with a batch size based on a stochastic gradient, the stochastic gradient defining a subset of training examples; and
    adding the stochastic gradient from each of the plurality of machines on a master machine for computing a total gradient for the DBN;
    wherein the identified batch size allows parallelization of computation of the gradient without inefficient overhead and faster than a single, non-parallel machine.

12. The method of claim 9 further comprising employing a batch size that is efficient for parallelization such that training may be performed faster with parallelization than without, and the batch size is not excessively large such that training is unstable.

13. A computer apparatus for training a deep belief network (DBN) for operational decoding, the computer apparatus comprising:
    a memory including an input layer for pre-training initial weights based on determined optimal weights;

pre-training logic for identifying, during pre-training, a batch size for the DBN and a number of parameters corresponding to the initial weights,
wherein:
a first error rate increase corresponds to the batch size for the DBN and a second error rate increase corresponds to a generative, non-discriminative pre-training batch size,
a first amount corresponds to the batch size for the DBN and to the generative, non-discriminative pre-training batch size,
an increase by the first amount in the batch size corresponds to the first error rate increase for the DBN,
an increase by the first amount in a generative, non-discriminative pre-training batch size corresponds to the second error rate increase, and
the first error rate increase is less than the second error rate increase; and
a plurality of machines, each having at least one processor, responsive to invocation for performing training in parallel fashion.

14. The computer apparatus of claim 13 wherein the pre-training logic is for performing hybrid pre-training, the hybrid pre-training including generative and discriminative pre-training;
the generative pre-training being based on unsupervised values; and
the discriminative pre-training being based on supervised values; the supervised values corresponding to a label.

15. The computer apparatus of claim 13 wherein training further comprises a pre-training stage and a fine-tuning stage, the fine-tuning stage further comprising discriminative back-propagation.

16. The computer apparatus of claim 15 wherein the optimal weights are closely linked to a final objective function of the DBN, the objective function being for the fine-tuning stage of training.

17. The computer apparatus of claim 14 wherein the DBN includes an input layer, an output layer, and a plurality of hidden layers, and wherein the pre-training further comprises:
pre-training at least two layers; and
replacing at least one layer of the DBN with a randomly initialized hidden layer.

18. The computer apparatus of claim 13 wherein identifying the batch size comprises identifying the batch size based on balancing Input/Output (TO) of the pre-training and an accuracy level of the training, the balancing being based on:
a number of invoked parallel machines performing the training; and
a communication overhead between each of the plurality of machines.

19. The computer apparatus of claim 18 wherein the computer apparatus is configured to:
invoke each of the plurality of machines with a batch size based on a stochastic gradient, the stochastic gradient defining a subset of training examples; and
add the stochastic gradient from each of the plurality of machines on a master machine for computing a total gradient for the DBN;
wherein the identified batch size allows parallelization of computation of the gradient without inefficient overhead and faster than a single, non-parallel machine.

20. A non-transitory computer readable storage medium having instructions that, when executed by at least one processor, perform a method for employing hybrid pre-training in a multi-layer neural network, the hybrid pre-training being operable for setting initial weights closer to optimal weights than generative pre-training, the method comprising:
pre-training initial weights based on determined optimal weights;
identifying, during pre-training, a batch size for the DBN and a number of parameters corresponding to the initial weights,
wherein:
a first error rate increase corresponds to the batch size for the DBN and a second error rate increase corresponds to a generative, non-discriminative pre-training batch size,
a first amount corresponds to the batch size for the DBN and to the generative, non-discriminative pre-training batch size,
an increase by the first amount in the batch size corresponds to the first error rate increase for the DBN,
an increase by the first amount in a generative, non-discriminative pre-training batch size corresponds to the second error rate increase, and
the first error rate increase is less than the second error rate increase; and
invoking a plurality of machines for performing training in parallel fashion.

* * * * *